United States Patent [19]

Sutor, IV

[11] Patent Number: 5,167,064
[45] Date of Patent: Dec. 1, 1992

[54] TUBE STABILIZER ASSEMBLY

[75] Inventor: Frederick W. Sutor, IV, North Hills, Pa.

[73] Assignee: Expando Seal Tools, Inc., Montgomeryville, Pa.

[21] Appl. No.: 806,850

[22] Filed: Dec. 9, 1991

Related U.S. Application Data

[63] Continuation of Ser. No. 585,483, Sep. 20, 1990, abandoned.

[51] Int. Cl.[5] .............................. B23P 15/26
[52] U.S. Cl. ................. 29/727; 29/402.08; 29/890.31; 138/89
[58] Field of Search .......... 29/890.31, 402.08, 402.09, 29/723, 726, 727; 138/89, 96; 72/393

[56] References Cited

U.S. PATENT DOCUMENTS

| | | |
|---|---|---|
| 3,691,609 | 9/1972 | Ice, Jr. et al. |
| 4,393,564 | 7/1983 | Martin ......................... 29/402.02 |
| 4,425,943 | 1/1984 | Martin . |
| 4,436,117 | 3/1984 | Martin . |
| 4,571,802 | 2/1986 | Calhoun et al. ............... 29/890.031 |
| 4,746,158 | 5/1988 | Fields ............................. 29/890.031 |
| 4,779,445 | 10/1988 | Rabe ............................. 29/727 X |
| 4,829,660 | 5/1989 | Everett et al. ............... 29/890.031 X |
| 4,831,702 | 5/1989 | Vossbrink et al. .............. 72/393 X |
| 4,831,703 | 5/1989 | Wilhelm et al. ................. 138/89 X |
| 4,831,720 | 5/1989 | Sherer et al. ................ 29/890.031 |
| 4,967,468 | 11/1990 | Vossbrink et al. .................. 29/726 |

OTHER PUBLICATIONS

Expando Seal Tool, Inc. Drawing No. DC 391, sheets 1 and 4 of 4 (with dates obliterated), for tube stabilizers sold to Duke Power Co., prior to Sep. 20, 1989.

Primary Examiner—Irene Cuda
Attorney, Agent, or Firm—Howson and Howson

[57] ABSTRACT

A tube stabilizer assembly and method for bridging a broken tube in a heat exchanger includes an elongate solid rod, on a collar on a flexible cable, which inserts with minimum clearance into the tube from one end and is anchored by a deformable plug assembly fixed to the rod or cable by a commercially-available plugging tool. The assembly has an outside dimension of sufficient clearance for sliding contact in the tube while immobilizing the loose ends of the tube against vibration.

13 Claims, 2 Drawing Sheets

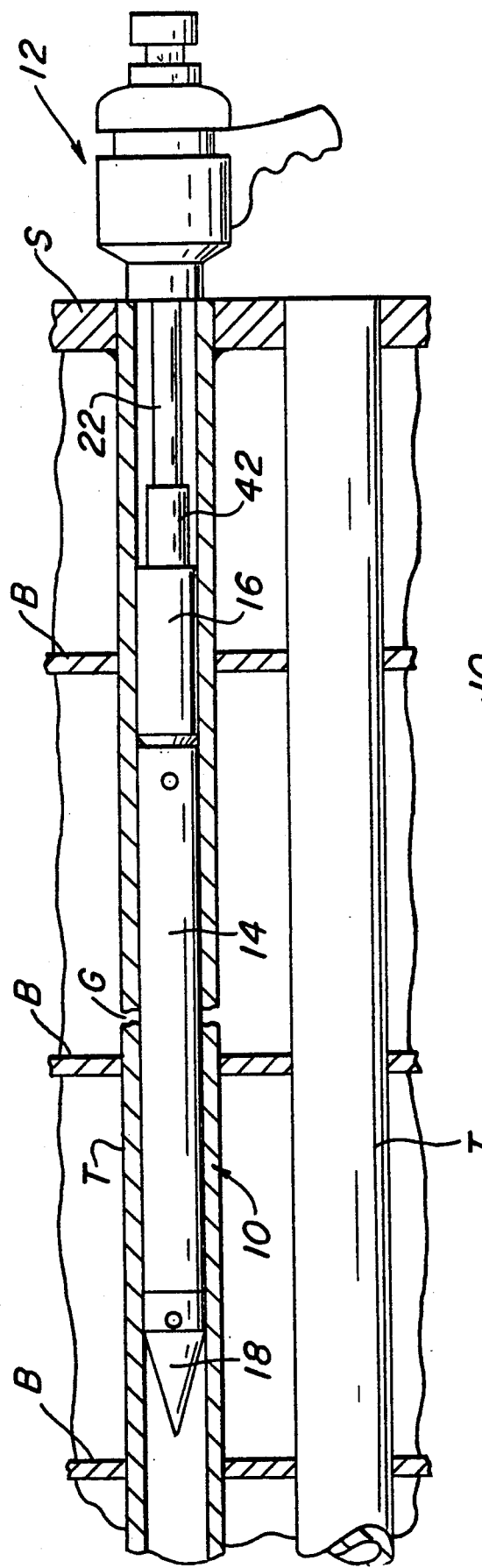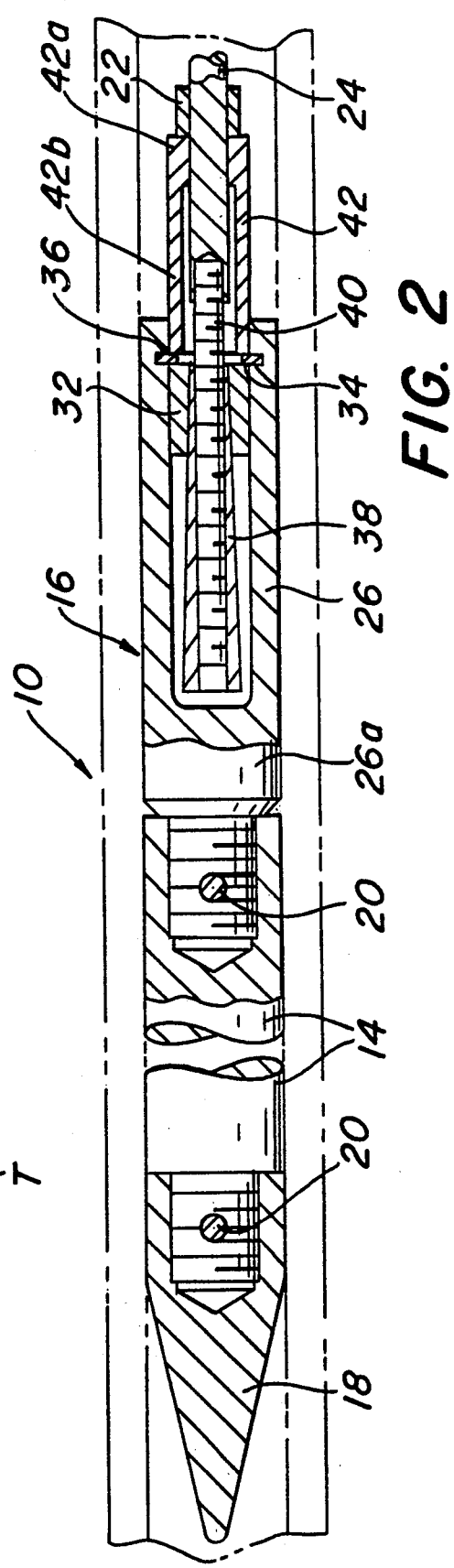

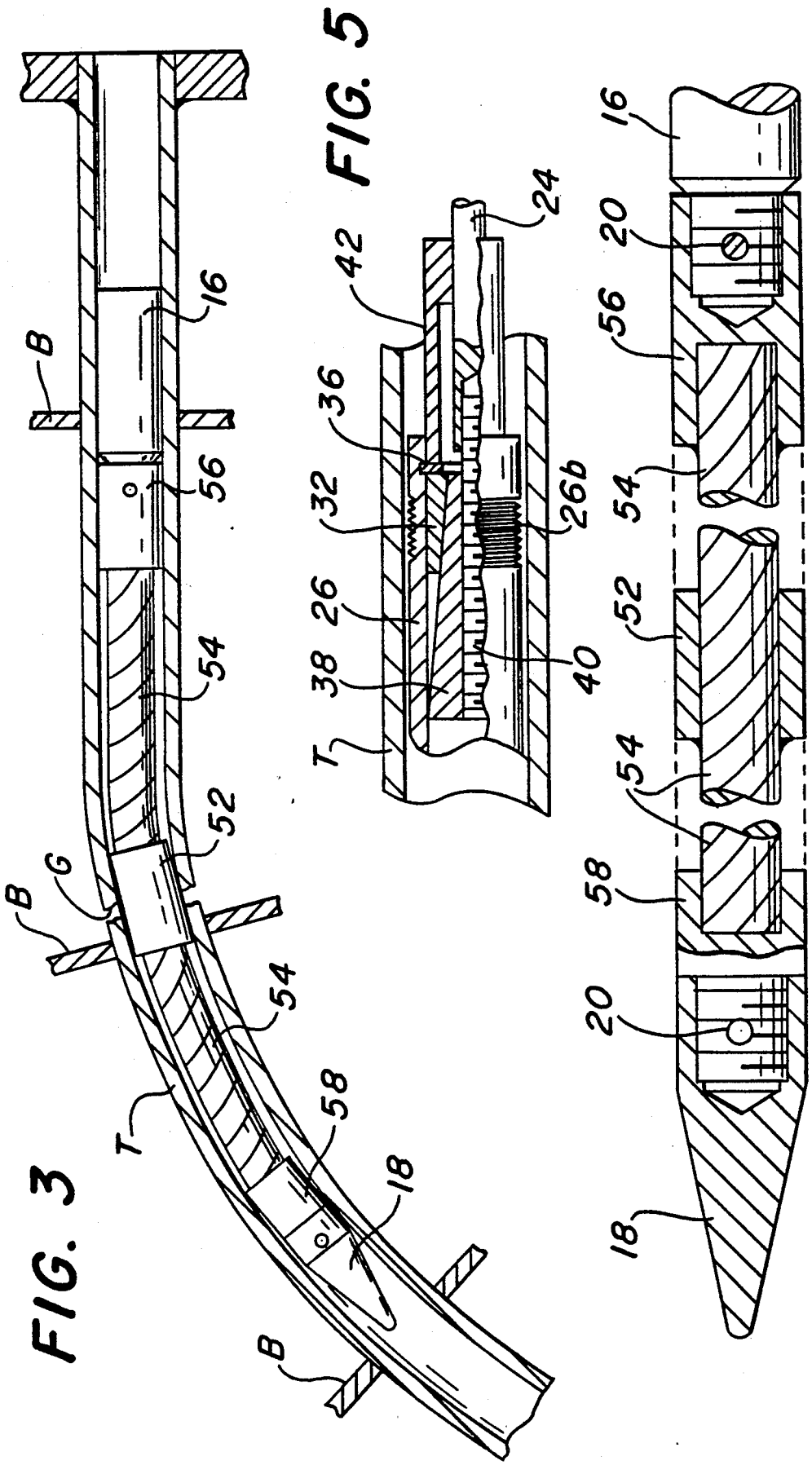

TUBE STABILIZER ASSEMBLY

This application is a continuation of U.S. patent application Ser. No. 07/585,483 filed Sep. 20, 1990.

BACKGROUND OF THE INVENTION

The present invention relates to repair of heat exchangers and the like, and more particularly to a method and apparatus for stabilizing the broken ends of a tube within a tubular heat exchanger, boiler or the like.

In enclosed or tubular type heat exchangers one fluid flows through a bundle of parallel tubes supported by tube sheets at both ends of an outer shell through which another fluid passes. Some designs include winding tubes, or baffles spaced along the length of the shell, to increase heat transfer. Over long periods of usage, the structural integrity of a tube may weaken and fracture due to vibration and thermal contraction and expansion. Rather than shut down operations for an extended period necessary to repair or replace the defective tube, a temporary "quick fix" is preferred which entails removing the end covers or heads and plugging the tube at both ends. Tube replacement is thereby deferred until a future planned shutdown. To minimize the downtime even further, only the cover at one end is removed and a special tool manipulated from the uncovered "near" end of the tube to secure a plug in the enclosed "far" end. For instance, U.S. Pat. No. 4,393,564 entitled "Method and Apparatus for Repairing Heat Exchangers" by John E. Martin, describes a hydraulically-operated plugging tool in which a compression tube and pull rod extend into the defective tube for tightly expanding an attached two-part tapered plug in the far end of the tube adjacent to the tube sheet. When the appropriate force for wedging the plug is applied between the tube and rod, the plug is released allowing the tool to be withdrawn from the tube. The near end of the tube may be similarly plugged using a shorter plugging tool.

Even with the defective tube plugged at both ends as described above, there are situations where the tube completely fractures at a location between the tube sheets or baffles leaving one or both disjoined ends free to vibrate. Fluid turbulence within the shell around the defective tube may then cause the free ends to strike adjacent working tubes in a whip-like motion and thereby exacerbate conditions. An attempt to solve this problem employs a stiff insert or stabilizer rod extended the full length of the defective tube to bridge the gap and immobilize the fractured ends. The stabilizer is secured within the tube by various methods such as by welding, roller expansion and explosive forming. Another method suggests anchoring the stabilizer to the tube by a ram-operated plug such as disclosed in U.S. Pat. No. 4,393,564, supra. However, if the stabilizer rod were to be anchored at both ends of the tube, then both end covers of the shell would have to be removed to install the plugs. On the other hand, if the rod were to be anchored at both ends from only one end of the tube with the above-described plugging tool, then the stabilizer rod would have to be hollow in order to access the far end. Such a requirement would considerably limit the stabilizer rod's strength and stiffness to such an extent that it may not withstand the stresses placed on it during normal heat exchange service. Moreover, a stabilizer rod, whether solid or hollow, if anchored at both ends of the defective tube, may cause untimely fatigue and damage to the tube sheets and adjacent tubes with repeated stresses due to differential expansion from thermal cycling of the heat exchanger.

SUMMARY OF THE INVENTION

Accordingly, it is an object of the present invention to provide a novel and improved tube stabilizer assembly for a heat exchanger or the like which will immobilize and prevent vibration of disjoined ends of a tube in a heat exchanger, which can be quickly and easily installed from one accessible end of the tube, which will withstand the stresses attending normal thermal cycling of the heat exchanger, and which imparts no stress on tube sheets and adjacent tubes.

Another object is to provide a tube stabilizer assembly which can be sized to accommodate any tube size normally encountered in heat exchangers, and which will maintain the structural integrity, strength and stiffness necessary to prevent vibration.

Still another object is to provide a tube stabilizer assembly for a heat exchanger which can be anchored at only one end to allow for thermal expansion and contraction without damage to the assembly or the heat exchanger.

A further object is to provide a tube stabilizer assembly which can be easily assembled at a job site for a broad range of applications, and which can be readily disassembled for shipping and storage.

A still further object is to provide a tube stabilizer assembly which is suitable for use in curved heat exchanger tubes or in heat exchangers located in spaces having limited access.

These and other objects and aspects of the invention are accomplished in one embodiment which is particularly suitable for use in straight tube heat exchangers. The tube stabilizer assembly includes a solid rod which slips with minimal clearance into a heat exchanger tube broken in two and accessible from one end. only one end of the rod is anchored in the tube by a deformable plug assembly and the other end extends through the tube an amount sufficient to bridge the break in the tube. The assembly is constructed in segments connected end-to-end including the rod, a lance-like tip on the insertion end of the rod for realigning the broken ends of the tube, and a deformable plug assembly at the other end for anchoring the assembly in the tube. This configuration enables the assembly to be quickly installed across the break from one end of the tube by a conventional plugging tool.

In a second embodiment suitable for use in heat exchangers with curved tubes or where there is limited access, the rod of the stabilizer assembly is replaced by a flexible cable connected between the tip and the plug. A relatively short-length collar fixed around the cable intermediate the ends slips into the curved tube with minimal clearance for positioning across the break in the tube in the same manner as the stabilizer rod of the first embodiment.

BRIEF DESCRIPTION OF THE DRAWINGS

For a better understanding of these and other objects and aspects of the invention, reference may be made to the following detailed description taken in conjunction with the accompanying drawings.

FIG. 1 is a longitudinal view in cross section of one embodiment of a tube stabilizer assembly according to the invention positioned for anchoring across a break in a tube by a plugging tool;

FIG. 2 is a more detailed view partially in cross section of the tube stabilizer assembly of FIG. 1;

FIG. 3 is a longitudinal view of another embodiment of a tube stabilizer assembly according to the invention installed across a break in a curved tube;

FIG. 4 is a more detailed view partially in cross section of a portion of the tube stabilizer assembly of FIG. 3; and FIG. 5 is a longitudinal view of a portion of an alternate embodiment of the tube stabilizer with deformable serrations according to the invention.

DESCRIPTION OF THE PREFERRED EMBODIMENTS

Referring now to the drawings wherein like characters designate like or corresponding parts throughout the several views, FIG. 1 shows in cross section a portion of a heat exchanger including one end of a defective tube T secured to a tube sheet S and a series of baffles B at spaced intervals along the length of tube T. A break in tube T is shown by a gap G located between two adjacent baffles B. The disjoined ends of tube T are immobilized in rigid alignment by a cylindrical stabilizer assembly 10 which is longitudinally positioned to bridge gap G. The size of assembly 10 is selected to provide an outside diameter with sufficient clearance for sliding contact with the inside of tube T, and preferably with sufficient length to span the distance between the tube supports such as baffles B on either side of gap G. Assembly 10 is anchored at one end to tube T by a plugging tool 12 of the type described in U.S. Pat. No. 4,393,564, supra.

As best illustrated in FIG. 2, assembly 10 includes a solid elongate rod 14 threadingly connected at one end to a deformable plug 16 and at the other end to a lance-like tapered nose 18. The components are prevented from unscrewing by locking pins 20 extending through the threaded connections. Nose 18 is tapered in order to realign, if necessary, the broken ends of tube T as the assembly 10 enters the region of gap G. Assembly 10 is anchored in the desired position along the length of tube T by wedging plug 16 in intimate engagement with tube T by a force transmitted through a compression tube 22 and pull rod 24 of plugging tool 12.

Plug 16 includes a sleeve 26 having a closed end section 26a externally threaded for engaging rod 14, and a deformable tubular section 26b open at the other end for coaxially receiving an expandable annular element 32. A split ring 34 seated in an annular groove 36 at the open end of tubular section 26b restricts outward travel of element 32. The bore of element 32 is tapered to receive a like-tapered non-deformable elongate frusto-conical wedge 38 disposed with its large end adjacent to the closed end section 26a. Internal threads axially extending through wedge 38 threadingly engage one end of an elongate adaptor 40 which extends through split ring 34, and the other end threadingly engages the outer end of pull rod 24.

To provide resistance at element 32 when wedge 38 is pulled outward by pull rod 24, a socket 42 is interposed between split ring 34 and compression tube 22. One end 42a of socket 42 which abuts the end of compression tube 22 slides on pull rod 24, and the other end 42b forms an annular surface which abuts split ring 34 in sleeve 26.

Installation of stabilizer assembly 10 is extremely simple and accomplished with minimal downtime of operations. When a tube fracture is apparent, the shell cover at only one end of the heat exchanger is removed to provide access to the defective tube. At this point it should be noted that stabilizer assembly 10 does not provide a fluid-tight seal at the gap G due to the clearance necessary for sliding it through tube T. Therefore, it may be necessary to install a plug assembly first at the far end of tube T such as in a manner described in U.S. Pat. No. 4,393,564, supra. The distance from the exposed end of the tube to the fracture is also measured in any suitable manner, such as by a test plug or a fiber optic sensor, to determine the length of compression tube 22 and pull rod 24 required for stabilizer assembly 10 to reach across gap G. With plugging tool 12, and tube 22 and rod 24 of the required lengths, properly assembled, socket 42 and adaptor 40 are attached with adaptor 40 threadingly connected to stabilizer assembly 10 and wedge 38. Assembly 10 is now positioned inside tube T to bridge gap G as shown in FIG. 1. Assembly 10 should preferably span tube supports such as baffles B on either side of the break. Tool 12 is then actuated to apply tension to pull rod 24 as compression tube 22 applies a resisting force through socket 42 against retainer 34. The resultant force causes wedge 38 to slide further into element 32, expand in sleeve 26, and anchor the deformable section 26b against the interior of tube T. Stabilizer assembly 10 is thereby positively fixed in tube T and immobilizes the broken ends against vibration. Pull rod 24 and adaptor 40 are then unscrewed from assembly 10, removed with compression tube 22 from the heat exchanger, and a second fluid-tight plug assembly may be installed at the near end of tube T. The shell cover may then be replaced for resuming heat exchanger operation. In lieu of unscrewing adapter 40, it may include a weak link which breaks when the proper tension has been applied to wedge 38.

In some applications, use of the second fluidtight plug assembly at the near end may be avoided. Referring to FIG. 5, deformable serrations 26b are formed around the circumference of deformable sleeve 26. As wedge 38 and element expand section 26b against tube T, the serrations will squash into contiguous fluid-tight contact with tube T.

Heat exchangers which utilize U-type or curved tubes or which have minimal clearance at either end may preclude use of a rigid stabilizer assembly as described above. Therefore a second embodiment of the invention is contemplated for these situations. Referring to FIG. 3, there is shown a stabilizer assembly 50 according to the invention installed across a gap G in a defective curved tube T supported at spaced intervals along the length by tube sheet S and baffles B. Assembly 50 includes a relatively short stabilizer tube 52 rigidly secured around a flexible cable 54, such as by weldings, intermediate the length thereof. Threaded members 56 and 58 fixed to respective ends of cable 54 threadingly connect to plug assembly 16 and nose 18, and locking pins 20 maintain a positive connection. In a manner such as described for the first embodiment, the stabilizer tube 52 is positioned in tube B across gap G and anchored by plug assembly 16.

Some of the many advantages and novel features of the invention should now be readily apparent. For example, a tube stabilizer assembly is provided for installation from one end of a tube of a heat exchanger for bridging and immobilizing disjointed ends of a defective tube. Only one end of the stabilizer is anchored to the tube allowing differential thermal expansion between the tube and the assembly with no stress imparted on the tube sheets or adjacent tubes. The tube stabilizer can be easily assembled at a job site for a broad range of applications including installation in curved heat exchanger tubes and in heat exchangers located in spaces with limited accessibility.

It will be understood that various changes in the details, materials, steps and arrangement of parts, which have been herein described and illustrated in order to explain the nature of the invention, may be made by those skilled in the art within the principle and scope of the invention as expressed in the appended claims.

I claim:

1. For installation in a heat exchanger by means of a ram-operated compression tube and pull rod, an apparatus for stabilizing a defective tube having a fracture permitting lateral disjuncture of one portion relative to an axially adjacent portion, comprising, in combination:
   rod means having sufficient length to extend axially across the disjuncture, defining a substantially uniform outside dimension along its length in close interfitting engagement with the inside of said portions for laterally and permanently immobilizing said portions across the disjuncture to maintain them in alignment with each other;
   plug means coaxially secured to one end only of said rod means and deformed by the compression tube and pull rod for permanently anchoring said rod means in position across said disjuncture along the interior surface of the defective tube; and
   said rod means having an other unsecured end for moving axially in the defective tube in response to thermal expansion and contraction of said rod means in the normal course of operation of the heat exchanger;
   whereby the defective tube is stabilized in a manner that causes minimal stress to be induced in the tube stabilizing apparatus and the heat exchanger.

2. Apparatus according to claim 1 wherein said plug means comprises:
   tubular means slidable lengthwise in the defective tube with minimal clearance and formed to be operatively connected to the compression tube; and
   wedge means slidable lengthwise in said tubular means and formed to be connected to said pull rod for radially expanding said tubular means against the interior surface of the defective tube.

3. Apparatus according to claim 2 wherein said plug means further comprises:
   serrations around the circumference of said tubular means deformable into substantially fluid-tight contact with the defective tube upon radial expansion of said tubular means against the defective tube.

4. Apparatus according to claim 1 wherein said rod means comprises:
   a straight rigid rod for immobilizing the disjointed ends of the defective tube; and
   a tapered nose threadingly secured to said rigid rod at the other end of said rod means for coaxially aligning the disjointed ends of the defective tube.

5. Apparatus according to claim 1 wherein said rod means comprises:
   a flexible cable; and
   a collar fixed around said cable intermediate the ends thereof for immobilizing the disjointed ends of the defective tube.

6. Apparatus according to claim 5 wherein said rod means further comprises:
   a tapered nose threadingly secured to the other end of said rod means for coaxially aligning the disjointed ends of the defective tube.

7. For installation with a plugging tool of the type having a ram-operated compression tube and pull rod, an apparatus for stabilizing disjointed ends of a defective tube in a heat exchanger, comprising, in combination:
   rod means formed to be installed contiguous with the interior surface of the defective tube across the disjuncture; and
   plug means secured to one end only of said rod means and formed to be deformed by the compression tube and pull rod for anchoring said rod means to the interior surface of the defective tube, said plug means including an outer cylindrical sleeve slidable lengthwise with minimum clearance in the defective tube, a coaxial annular element in said sleeve contiguous with the interior surface of said sleeve, and a retainer secured to said sleeve and formed to abut the compression tube for limiting the outward movement of said element in said sleeve, and wedge means slidable lengthwise in said sleeve with threads for interengaging corresponding threads in the pull rod for radially expanding said sleeve against the interior surface of the defective tube.

8. Apparatus according to claim 7 wherein said plug means further includes:
   an elongate adaptor having one end extending through said retainer and threadingly engaging said wedge, and another end formed to threadingly engage said pull rod; and
   a socket slidable on said adaptor for interengaging said retainer and the compression tube.

9. Tube stabilizing apparatus for aligning and immobilizing the confronting ends of a discontinuous tube, comprising, in combination:
   a rod slidable along the inside of the discontinuous tube for positioning across the confronting ends, said rod being a substantially rigid cylinder having a substantially uniform outside diameter along its length of sufficient size for close interfitting engagement on the inside of the confronting ends and for rigidly aligning the confronting ends of the discontinuous tube; and
   plug means secured to one end only of said rod and deformable against the inside of said tube for anchoring said rod to the interior surface of the discontinuous tube in a manner permitting axial expansion and contraction of said rod away from said anchored one end;
   whereby the tube can be stabilized in a manner which minimizes thermally-induced stresses in the stabilizing apparatus.

10. Apparatus according to claim 9 wherein said plug means comprises:
   tubular means slidable lengthwise in the discontinuous tube with minimal clearance; and
   wedge means slidable lengthwise in said tubular means for expanding said tubular means radially against the interior surface thereof.

11. Tube stabilizing apparatus for aligning and immobilizing the confronting ends of a discontinuous tube, comprising, in combination:
- a rod formed to be installed contiguous with the inside of the discontinuous tube across the confronting ends; and
- plug means secured to one end only of said rod and deformable for anchoring said rod to the interior surface of the discontinuous tube, said plug means including an outer cylinder sleeve slidable lengthwise in the discontinuous tube with minimal clearance, a coaxial annular element in said sleeve contiguous with the interior surface of said sleeve, and a retainer secured to said sleeve for limiting the outward movement of said element in said sleeve, and wedge means slidable lengthwise in said plug means for expanding said sleeve radially against the interior surface thereof.

12. Apparatus for stabilizing a tube having a fracture, comprising, in combination:
- an elongate insert formed to be installed in the tube and extending across the fracture, said insert having a substantially rigid cylindrical portion of substantially uniform outside dimension along its length sized for close interfitting engagement with the tube across the fracture and thereby immobilizing the tube against lateral movement across the fracture, said insert having opposite axially-spaced ends;
- a deformable ring coaxially secured to one end only of said insert; and
- a wedge mounted in said ring and slidable relative thereto;

whereby axially opposed forces applied respectively to said ring and said wedge radially expand said ring against the interior surface of the tube for anchoring said insert thereto in a manner permitting the unsecured other end of the insert to move axially in the tube in response to thermal expansion and contraction.

13. Apparatus according to claim 12 further comprising:
- serrations around said ring deformable into substantially fluid-tight engagement with the tube when said ring is expanded against the interior surface of the tube.

* * * * *